June 15, 1943.   H. B. HULL   2,321,815
DOMESTIC APPLIANCE
Filed June 20, 1940
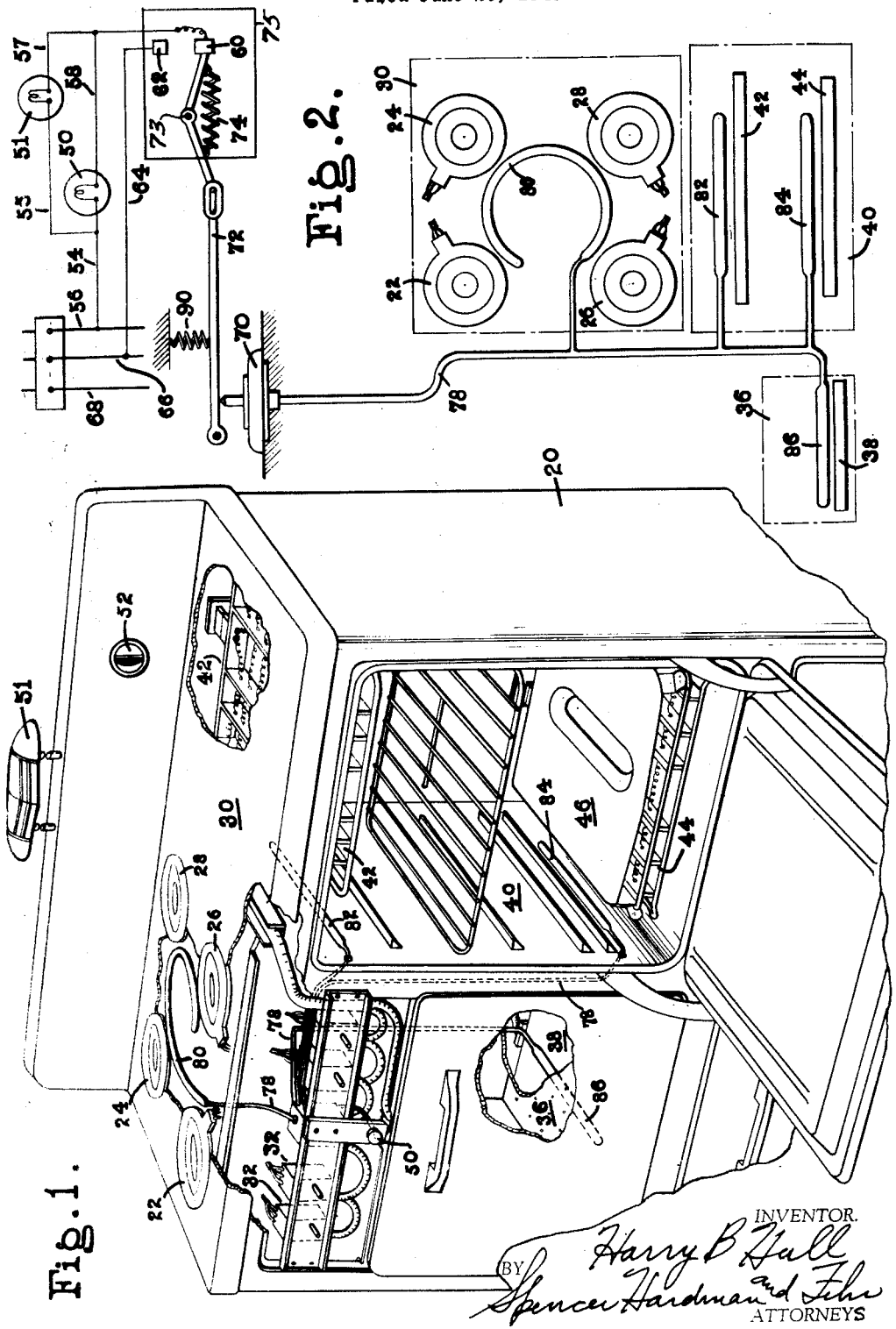
INVENTOR.
Harry B Hull
BY Spencer Hardman and Fehr
ATTORNEYS Patented June 15, 1943

2,321,815

UNITED STATES PATENT OFFICE 2,321,815

DOMESTIC APPLIANCE

Harry B. Hull, Dayton, Ohio, assignor to General Motors Corporation, Dayton, Ohio, a corporation of Delaware Application June 20, 1940, Serial No. 341,512

1 Claim. (Cl. 177—311)

This invention relates to a domestic appliance and more particularly to indicating devices for ranges.

In ranges where the heating device emits no light as in electric ranges, and also where the heating units are concealed, it is practically necessary, or at least desirable, to provide some sort of indicating or warning device to indicate when one of the heating units is in operation. Otherwise there is considerable danger that, unintentionally, one or more of the heating units may be left in operation.

It is an object of my invention to provide a single indicating device which will indicate the use of any one of many heating units in a range.

It is another object of my invention to provide an indicating device for a range which operates thermostatically according to the heating effect of any of the heating elements of the range.

It is a more specific object of my invention to provide a single indicating device for a range which is controlled by a thermostatic tubular system having portions exposed to each of the heating elements of the range.

It is still another object of my invention to provide an automatic control for the illuminating light upon a range by which, whenever any heating unit of the range is being used, the illuminating light is lighted.

Further objects and advantages of the present invention will be apparent from the following description, reference being had to the accompanying drawing, wherein a preferred form of the present invention is clearly shown.

In the drawing:

Fig. 1 is a perspective view of an electric range embodying one form of my invention; and Fig. 2 is a diagrammatic view of the indicating system for a range.

Briefly, I have shown an electric range having four surface heating units, a two-unit electric oven and a warming unit. An indicating electric light is provided upon the front panel of the range and is controlled by a thermostatic switch. The illuminating light upon the range is also controlled by this switch. This thermostatic switch is operated in accordance with the pressure of a fluid pressure system which includes tubular connections with branches extending adjacent each of the heating units of the range. The tubular system is charged with any sort of means which creates a fluid pressure in accordance with a rise or fall in temperature.

Referring to the drawing and more particularly to Fig. 1 there is shown an electric range 20 provided with surface heating units 22, 24, 26 and 28 on the top 30 of the range. The surface heating units are controlled from a switch bank including the switches designated by the reference character 32. Beneath the switch bank there is provided a warming drawer 36 which is provided with an electric warming unit 38. At the side of the warming drawer 36 is the electric oven 40 which is provided with an upper heating unit 42 in the top of the oven and a lower heating unit 44 which is provided beneath a suitable constructed baffle 46.

It is difficult to provide a simple satisfactory form of electric indicating device which is controlled directly by the electrical energization of any of the various heating units in the electric range. Therefore, as my invention, I provide a thermostatic system which is controlled by the heat emitted by any one of the heating units of the range. Since I use a thermostatic system of control, my system is not limited to an electric range but may be used with any type of heating element such as gas heating elements.

The indicating device proper is in the form of an indicating light 50 mounted below the switch bank, including the switches 32. The switch bank may also be provided with a switch for controlling the warming unit 38 while the switch 52 may be provided for controlling the oven heating units.

As another feature of my invention, I employ the thermostatic system, previously mentioned, for providing an automatic lighting of the illuminating light 51, located at the rear of the range. Like the indicating light 50, the illuminating light 51 will be lighted whenever, and as long as, any heating unit of the range is in operation. In fact, the illuminating light may also be used as an indicating light and the indicating light proper eliminated.

As illustrated diagrammatically in Fig. 2, the indicating light 50 has one of its terminals connected by the conductor 54 to the source of power which supplies the power to the electric range, preferably to one of the outside conductors 56. The other terminal of the indicating light 50 is connected by the conductor 58 to one of the contacts 60 of a switch mechanism which has a second contact 62 connected by the conductor 64 to the neutral conductor 66 of a standard three-wire Edison circuit. The illuminating light 51 is connected in parallel with the indicating light by the conductors 55 and 57 which connect with the conductors 54 and 58. The other live conductor 68 is not used for the indicating device.

All three supply conductors are used to supply the electric energy to the various heating units of the range.

The switch contacts 60 and 62 form part of a switch mechanism which includes a closed diaphragm 70 operating a lever 72 which in turn is connected to and operates a toggle snap action mechanism 74 which carries the contact 60 into and out of contact with the contact 62 to close or open the circuit of the indicating light 50 and the illuminating light 51, to cause these lights to be energized or deenergized. The stationary contact 62 and the stationary toggle pivot pin 73 are carried by the switch supporting member 75. The diaphragm 70 is connected by a tubular connecting system 78 to a thermostat bulb 80 located immediately beneath the top 30 and extending in a circular path so that it is exposed to the heating effect of the four surface heating units 22, 24, 26 and 28. The tubular connecting system 78 also connects with a bulb 82 exposed to the heating effect of the upper oven heating unit 42 and to a bulb 84 exposed to the heating effect of the lower oven heating unit 44. The tubular connecting system 78 is also connected to a bulb 86 exposed to the heating effect of the heating unit 39 for the warming drawer 36.

The bulbs and tubular connecting system 78 may be charged with a thermally expansible liquid so that when any one or more of the heating units are energized, the liquid within the bulb will expand and cause the diaphragm 70 to be expanded and operate the lever 72, the snap action mechanism 74 and the contacts 60 to cause it to make contact with the contact 62 to close the circuit of the indicating light 50 and the illuminating light 51 in order to give warning that one of the heating units is in operation and to provide illumination while the range is in use. Such a warning is especially desirable in an electric range where the heat is not visible or in any range where there is no visible indication of the operation of a heat unit. It is also desirable to provide illumination automatically whenever the range is in use.

Instead of a thermally expansible liquid, a volatile liquid may be used, or even a gas may be used, if desired. Also, if desired, the bulbs may be charged with activated charcoal and the system charged with a gas which is adsorbed and evolved from the charcoal in bulbs upon changes in temperature. The switch mechanism is so designed that it can accommodate varying amounts of expansion of the diaphragm 70. A spring 90 is provided for maintaining the lever 72 in operative connection with the diaphragm 70. The snap action mechanism 74 can accommodate a movement of the lever 72 of considerable amplitude.

Thus it will be seen that I have provided an indicating system which requires only a single switch or control device for the indicating device. Obviously if desired the light could be replaced by some other form of indicating device such as a movable sign or a warning bell. Also, this switch or control is used to automatically control the illuminating light so that it also serves as an indicator.

While the form of embodiment of the invention as herein disclosed, constitutes a preferred form, it is to be understood that other forms might be adopted, all coming within the scope of the claim which follows.

What is claimed is as follows:

A domestic range comprising a plurality of heating units remotely positioned in different parts of the range, an electrical indicating device, means for conducting electrical energy to the indicating device, a single switch means in said conducting means for controlling the energization of said indicating device, individual heat absorbing means extending into heat exchange relation with each of said heating units and single fluid means in heat exchange relation with said absorbing means for operating said single switch means.

HARRY B. HULL.